US011182370B2

(12) United States Patent
Boehme et al.

(10) Patent No.: US 11,182,370 B2
(45) Date of Patent: *Nov. 23, 2021

(54) REORGANIZING A DATA TABLE TO IMPROVE ANALYTICAL DATABASE PERFORMANCE

(71) Applicant: INTERNATIONAL BUSINESS MACHINES CORPORATION, Armonk, NY (US)

(72) Inventors: Thomas F. Boehme, Boeblingen (DE); Andreas Brodt, Gerlingen (DE); James L. Finnie, Boeblingen (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/390,320

(22) Filed: Apr. 22, 2019

(65) Prior Publication Data

US 2019/0243814 A1 Aug. 8, 2019

Related U.S. Application Data

(63) Continuation of application No. 15/146,176, filed on May 4, 2016, now Pat. No. 10,318,514.

(51) Int. Cl.
*G06F 16/22* (2019.01)
(52) U.S. Cl.
CPC ................. *G06F 16/2282* (2019.01)
(58) Field of Classification Search
CPC .................................. G06F 16/2282
See application file for complete search history.

(56) References Cited

U.S. PATENT DOCUMENTS

| 6,598,042 | B1 | 7/2003 | Kienan |
| 8,996,544 | B2 | 3/2015 | Ziauddin et al. |
| 2004/0003005 | A1* | 1/2004 | Chaudhuri ............ G06F 16/215 |

(Continued)

OTHER PUBLICATIONS

IBM: List of IBM Patents or Patent Applications Treated as Related (Appendix P), May 2, 2019, 2 pages.

(Continued)

*Primary Examiner* — Pierre M Vital
*Assistant Examiner* — Andrew N Ho
(74) *Attorney, Agent, or Firm* — Teddi E. Maranzano

(57) ABSTRACT

Reorganizing a data table to improve analytical database performance. Attribute value information for data blocks of the data table is determined. One or more queries having respective query predicates involving the attribute may be received and processed. Data blocks having attribute value information matching a query predicate are selected. The selected data blocks are evaluated for the query predicate of the query. For each part of a set of the parts a false positive rate may be determined. The false positive rate may indicate the fraction of data blocks of the selected data blocks of the part, that each contains less than a determined maximum number of rows that satisfy the query predicate. In response to determining the false positive rate, determining a subset of parts including the sorted part that fit into a level of granularity higher than the selected level of granularity and sorting the subset of parts.

16 Claims, 3 Drawing Sheets

(56) References Cited

U.S. PATENT DOCUMENTS

| | | | |
|---|---|---|---|
| 2004/0034643 A1* | 2/2004 | Bonner | G06F 16/2282 |
| 2007/0143380 A1* | 6/2007 | Plow | G06F 16/2282 |
| 2010/0082648 A1* | 4/2010 | Potapov | G06F 16/24557 707/756 |
| 2010/0174725 A1 | 7/2010 | Adams | |
| 2010/0175024 A1 | 7/2010 | Schumacher | |
| 2010/0179936 A1 | 7/2010 | Jeremiah | |
| 2010/0281013 A1 | 11/2010 | Graefe | |
| 2011/0282830 A1* | 11/2011 | Malige | G06F 16/185 707/609 |
| 2011/0302226 A1 | 12/2011 | Abadi et al. | |
| 2012/0046989 A1* | 2/2012 | Baikalov | G06Q 10/0635 705/7.28 |
| 2012/0330996 A1 | 12/2012 | Chang | |
| 2013/0275367 A1 | 10/2013 | Shuma et al. | |
| 2014/0095520 A1 | 4/2014 | Ziauddin | |
| 2014/0229428 A1 | 8/2014 | Konik et al. | |
| 2015/0286682 A1 | 10/2015 | Ziauddin | |
| 2017/0322962 A1 | 11/2017 | Boehme et al. | |
| 2018/0101555 A1 | 4/2018 | Boehme | |

OTHER PUBLICATIONS

Bhardwaj et al., "Optimization of Stochastic Database Cracking", May 8, 2013, pp. 1-11.

Chugh, "Review of Database Cracking Techniques", International Journal of Recent Research Aspects ISSN: 2349-7688, Jun. 2015, pp. 42-44, vol. 2, Issue 2, © 2014 IJRRA.

Graefe et al., "Self-selecting, Self-tuning, Incrementally Optimized Indexes", EDBT 2010, Mar. 22-26, 2010, pp. 371-381.

Halim et al., "Stochastic Database Cracking: Towards Robust Adaptive Indexing in Main-Memory Column-Stores", Proceedings of the VLDB Endowment, Aug. 27-31, 2012, pp. 502-513, vol. 5, No. 6.

IDREOS, "Database Cracking", 2007, pp. 1-11, CIDR 2007.

IDREOS, "Database Cracking: Towards Auto-tuning Database Kernels", Jun. 24, 2010, pp. 1-270.

Kersten et al., "Cracking the Database Store", Proceedings of the 2005 CIDR Conference, 2005, pp. 1-12.

Khachatryan et al., "Improving Accuracy and Robustness of Self-Tuning Histograms by Subspace Clustering", IEEE Transactions on Knowledge and Data Engineering, Mar. 25, 2015, pp. 1-17, vol. 27, Issue: 9, IEEE.

Markl et al., "Robust Query Processing through Progressive Optimization", SIGMOD 2004, Jun. 13-18, 2004, pp. 1-12.

Oracle Help Center, "Database Data Warehousing Guide", 13 Using Zone Maps, Printed Oct. 28, 2015, pp. 1-25, Oracle Database Online Documentation 12c Release 1 (12.1).

Schuhknecht et al., "The Uncracked Pieces in Database Cracking", Proceedings of the VLDB Endowment, Sep. 1-5, 2014, pp. 97-108, vol. 7, No. 2.

\* cited by examiner

REORGANIZING A DATA TABLE TO IMPROVE ANALYTICAL DATABASE PERFORMANCE

BACKGROUND

This disclosure relates generally to the field of digital computer systems, and more specifically, to a method for improving analytical database performance.

Analytical database systems manage large amounts of data and are optimized for queries that may read large portions of the data. Query performance in such analytical databases is highly dependent on the amount of data to be processed. To achieve good query performance, a reorganization of the data is typically performed frequently, for example every time a significant number of rows has been inserted into a table. However, frequent reorganizations come at high costs, both in CPU and I/O load, elapsed time, and the amount of required temporary working memory and disk storage.

SUMMARY

According to one embodiment, a computer implemented method for reorganizing a data table to improve analytical database performance is provided. The method provides determining attribute value information for data blocks of the data table. The method further provides defining parts of the data table, each part containing at least two of the data blocks. The method also provides receiving one or more queries having respective query predicates involving the attribute. The method provides processing each query of the received queries. The processing includes selecting each data block of the data blocks whose attribute value information matches a query predicate of the query; processing the selected data blocks for evaluating the query predicate. The processing further includes for each part of a set of the parts: determining a false positive rate indicative of the fraction of data blocks of the selected data blocks of the part, that each contains less than a determined maximum number of rows that satisfy the query predicate. For each part of the set of parts: in response to determining that the determined false positive rates of the part meet a predefined condition sorting the part based on the attribute. The processing further includes receiving a further query having a respective query predicate involving the attribute, repeating the processing step and in response to determining that the determined false positive rate of a sorted part of the set of parts meet the predefined condition, determining a subset of parts of the set of parts including the sorted part that fit into a level of granularity higher than the selected level of granularity and sorting the subset of parts.

According to another embodiment, a computer program product for reorganizing a data table to improve analytical database performance is provided. The computer program product includes a computer readable non-transitory storage medium having program instructions executable by a processor embodied therewith, the program instructions executable by a processor, for performing a method. The method provides determining attribute value information for data blocks of the data table. The method further provides defining parts of the data table, each part containing at least two of the data blocks. The method also provides receiving one or more queries having respective query predicates involving the attribute. The method includes processing each query of the received queries. The processing includes selecting each data block of the data blocks whose attribute value information matches a query predicate of the query, processing the selected data blocks for evaluating the query predicate, and for each part of a set of the parts: determining a false positive rate indicative of the fraction of data blocks of the selected data blocks of the part, that each contains less than a determined maximum number of rows that satisfy the query predicate. For each part of the set of parts: in response to determining that the determined false positive rates of the part meet a predefined condition, sorting the part based on the attribute. The processing includes receiving a further query having a respective query predicate involving the attribute, repeating the processing step and in response to determining that the determined false positive rate of a sorted part of the set of parts meet the predefined condition, determining a subset of parts of the set of parts including the sorted part that fit into a level of granularity higher than the selected level of granularity and sorting the subset of parts.

According to another embodiment, a computer system for reorganizing a data table to improve analytical database performance is provided. The computer system includes one or more processors, one or more computer-readable non-transitory storage devices, and a plurality of program instructions stored on at least one of the one or more non-transitory storage devices for execution by at least one of the one or more processors, and causing the at least one processor to execute the method of determining attribute value information for data blocks of the data table. The method further provides defining parts of the data table, each part containing at least two of the data blocks. The method also provides receiving one or more queries having respective query predicates involving the attribute. The method provides processing each of the received queries including: selecting each data block of the data blocks whose attribute value information matches a query predicate of the query, processing the selected data blocks for evaluating the query predicate, and for each part of a set of the parts: determining a false positive rate indicative of the fraction of data blocks of the selected data blocks of the part, that each contains less than a determined maximum number of rows that satisfy the query predicate. For each part of the set of parts: in response to determining that the determined false positive rates of the part meet a predefined condition, sorting the part based on the attribute. The processing includes receiving a further query having a respective query predicate involving the attribute, repeating the processing step and in response to determining that the determined false positive rate of a sorted part of the set of parts meet the predefined condition, determining a subset of parts of the set of parts including the sorted part that fit into a level of granularity higher than the selected level of granularity and sorting the subset of parts.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
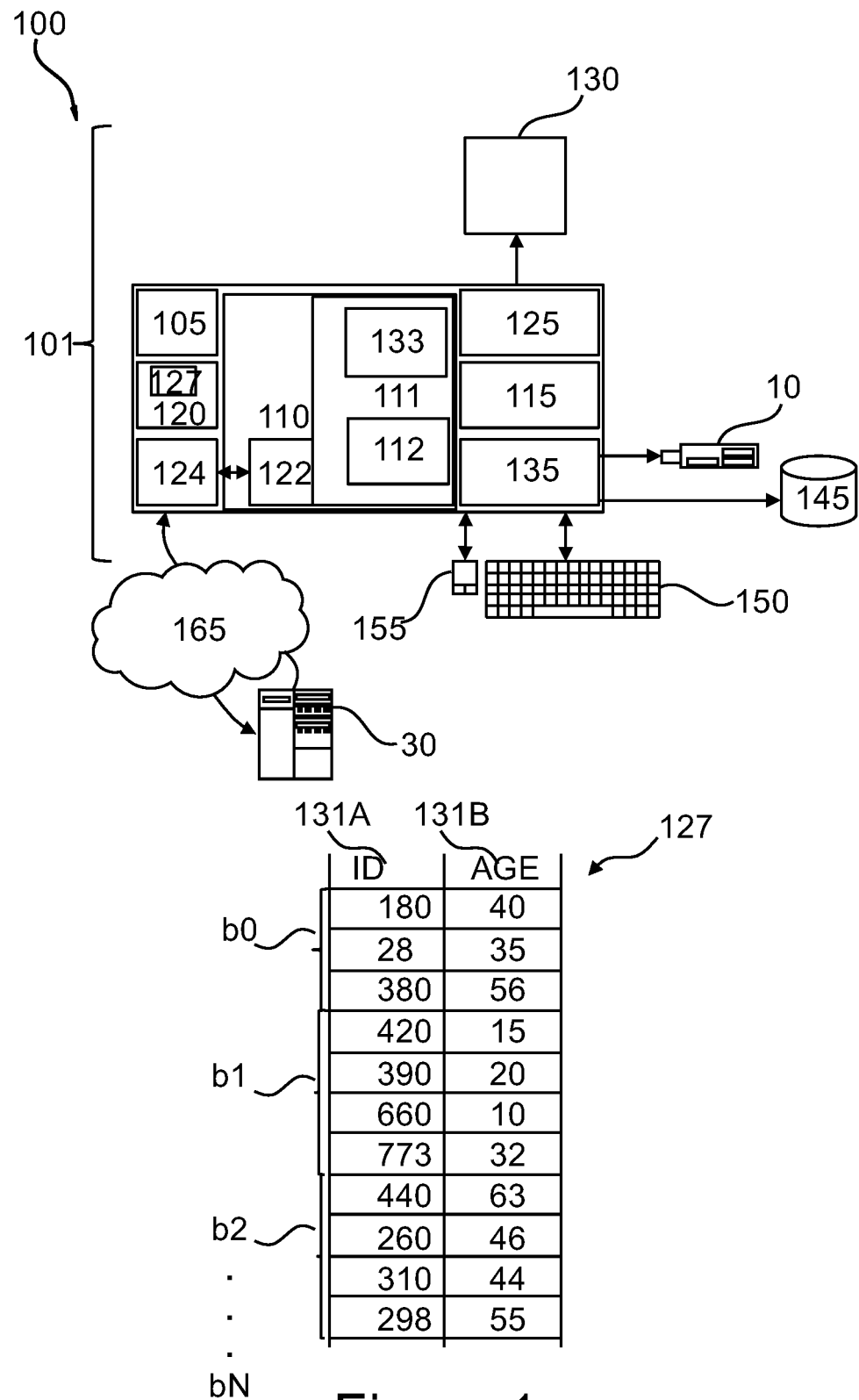
FIG. 1 illustrates represents a computerized system, suited for implementing one or more method steps as involved in the present disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

To mitigate the need to run a costly reorganization on a data table frequently, the number of unnecessary data blocks can be reduced by reorganizing only those parts of the data table that reduce effectiveness of the zone map. In data warehouse appliances, a zone map is a persistent data table that contains information about the data in the table, for example, the minimum and maximum of each column value in each extent of the table. Therefore, an effective zone map may aid query performance since only the extents containing the desired data, rather than the whole data table, may be accessed. Optimal zone maps have lowest false positive rate and highest number of blocks that fully match a predicate. Optimal zone map effects are achieved when the data is sorted by the columns referenced in the query predicate, and when these sort columns (also referred to as organizing columns) have the minimum and maximum as narrow as possible.

Effective query performance depends on the order of the data in the parts of the data table, and the executed query predicates. A query predicate is an expression that is part of the query and that resolves to true, false, or unknown.

A query's false positive rate is recorded. For different parts of the data table, the false positives rate $\rho_{cp}$ is determined. For every query with a predicate on column or attribute c and every part p of the data table, the number of data blocks in p that actually did contain at least one matching row may be put in relation to the number of data blocks in p which the query had to scan due to the attribute value information:

$$\rho_{c_p} = \frac{\#\text{blocks in } p \text{ containing matches}}{\#\text{scanned blocks in } p}$$

Ideally, $\rho_{cp}=1$, i.e. only data blocks are scanned which contain matching rows. If $\rho_{cp}$ is low for many queries, then attribute c should be defined as an organizing column. An organizing column enhances I/O and query performance because it sorts table rows into blocks with equal values in the organizing column. In addition, for different parts p of the data table, $\rho_{cp}$ may not be equally high, particularly if the data table was reorganized at some point in time. From the false positive rates $\rho_{cp}$ across all parts p, those parts which benefit the most from reorganizing are selected. This may be done by introducing a configurable threshold T for $\rho_{cp}$ below which the false positive rate is tolerable. Only those parts p of the data table need to be reorganized, for which $\rho_{cp}>T$.

A partial reorganization of the data table may be less costly in terms of CPU and I/O load, elapsed time, and the amount of required temporary working memory and disk storage, than reorganizing the entire data table. Furthermore, in many use cases the data emerges over time, e. g. for unique key columns or time-related values. To achieve faster data load, analytical database systems may store the data rows in the order of arrival, which is more or less random. In this case, assuming sufficiently large parts of the data table, a partial reorganization may even yield as good results as a full sort of the data table, because most value ranges uniquely exist in one particular part. Thus a balance is reached between reorganization costs and higher query processing costs due to false positives. After the partial reorganization of the data table (e.g. sorting by the attribute) and recalculation of the attribute value information, query processing may be efficient. This is because false positives rates (i.e. unnecessarily scanned blocks) are less likely.

According to one embodiment, the data table is stored on a storage device. The embodiment further includes determining levels of storage granularity of the storage device, whereby granularity refers to the level of depth represented by the data in a data table. High granularity indicates a high level of detail, whereas low granularity may represent a summary view of data. The embodiment includes determining the parts of the data table such that each part of the parts fits into a selected level of the levels of storage granularity. Therefore, the present embodiment may seamlessly be integrated with existing systems. Making use of existing storage structures may save processing resources that would otherwise be required for defining the parts from scratch.

Another embodiment further includes receiving a further query having a respective query predicate involving the attribute, repeating the processing step and in response to determining that the determined false positive rate of a sorted part of the set of parts meet the predefined condition determining a subset of parts of the set of parts including the sorted part that fit into a level of granularity higher than the selected level of granularity and sorting the subset of parts. This embodiment may still have the advantage of saving processing resources compared to the case where the full data table is to be sorted or organized. Furthermore, this embodiment may further improve the query performance by reducing the number of unnecessary scanned data blocks.

According to another embodiment, the processing of the query includes determining the respective maximum number of rows based on the query predicate. This embodiment may enable dynamically determining the maximum number of rows for each query. For example, the number of rows that satisfy an equality predicate is mostly smaller than the number of rows that would satisfy an inequality predicate. Thus by providing the threshold (i.e. maximum number of rows) query dependent the query performance may further increase.

Another embodiment further includes providing patterns of query predicates, each pattern being associated with a respective category; parsing the query predicate into constituent parts; determining that a constituent part parsed from the query predicate corresponds to at least part of a pattern of the patterns; associating the category that is associated with the pattern with the query; determining the maximum number of rows based on the associated category. The category may for example be equality or inequality predicate category. For example, in case the category is an inequality predicate, the pattern associated with the query may comprise signs "<", ">", or a combination thereof (e.g. that express more complex predicates involving complex comparisons or the like). This embodiment may provide an accurate and automatic method for determining the maximum number of rows which may thus further increase the query performance compared to an error-prone manual method e.g. requiring user inputs. This may be particularly advantageous for large databases that receive numerous query requests.

According to one embodiment, the maximum number of rows is one (equal to 1) if the associated category is an equality predicate.

According to one embodiment, the maximum number of rows is jointly determined for the received queries. This embodiment may save processing that would otherwise be required for calculating the maximum number of rows for every query. This may particularly be advantageous in case of databases that receive similar query requests.

According to one embodiment, the maximum number of rows is higher than one and smaller than a predefined maximum number. An accurate common or joint determination of the maximum number of rows may increase the query performance in that it may reduce the number of unnecessary reorganization steps.

Another embodiment further includes calculating an average of the determined false positive rates. The predefined condition includes the average being higher than a predetermined minimum threshold. This embodiment may have the advantage of balancing between the reduction of the number of unnecessary scanned data blocks and the saving of the processing resources. This is because some of the too high or too small false positive rates may be accidental and thus be unreliable.

According to an embodiment, the predefined condition includes the highest false positive rate of the determined false positive rates being higher than a predetermined minimum threshold. This may provide a safer method that may increase the query performance in that the number of unnecessary scanned data blocks may be reduced to a minimum.

According to another embodiment, the predefined condition includes the smallest false positive rate of the determined false positive rates being higher than a predetermined minimum threshold. This may be advantageous e.g. in case of test analysis.

According to one embodiment, the parts of the data table are randomly determined e.g. based on the number of data blocks or based on the physical storage.

According to one embodiment, the attribute value information is the maximum and the minimum values of the attribute for each data block of the data blocks.

Referring to FIG. 1, a computerized system is illustrated, operable to various embodiments of this disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a digital computer, such as a personal computer, workstation, minicomputer, or mainframe computer.

In exemplary embodiments, in terms of hardware architecture, as shown in FIG. 1, the computer 101 includes a processor 105, memory 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 e.g. instructions to manage databases such as a database management system. The memory 110 may further comprise a query optimizer. The query optimizer may comprise instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise at least one data table (or dataset) 127. For example, the software 112 may receive (automatically or upon request) as input the data table 127, or may download the data table 127 from storage 120.

The data table 127 may comprise one or more columns 131A-N, wherein each column is represented by a respective attribute (e.g. "ID" 131A and "Age" 131B). The rows of the data table 127 may comprise values of the attributes. The data table 127 may for example comprise multiple data blocks b0-bN.

For example, the data table 127 may be divided or split into data blocks b0-bN using the number of rows in the data table 127 e.g. 1000 rows per data block b0-bN.

In another example, the data table 127 may be split or divided based on storage size such that each data block b0-bN contains a predefined number of storage units e.g. data pages.

The term storage unit, as used herein is intended to refer to the minimum addressable unit (e.g. by software 112) in order to store the data table 127. The size of a storage unit may be an integer multiple of the size of a disk unit. The size of the storage unit may be user defined. For example, each storage unit (e.g. data page) may correspond to a specific number of bytes of physical database space on disk (e.g., 4 KB). Other storage units having different granularities may be addressable or used in order to store data e.g. in the storage 120. For example, other storage units may comprise containers and extents, wherein extents can be defined in term of number of data pages, while a container can be determined in term of number of extents. In this case, the container has a higher granularity than the extent, and the extent has a higher granularity than the data page.

The rows of each data block e.g. b1 of the data table 127 may be stored on contiguous, linked, or indexed disk units (e.g. of storage 120) that form the corresponding data pages of the data block b1. The term disk unit refers to the minimum addressable unit on storage 120. For example, a disk unit may have a size of 512 bytes. The data blocks b0-bN may or may not comprise the same number of data pages.

The division of the data table 127 may be randomly performed or through a preselection criterion. The random division may particularly be advantageous for the range searches as it may provide data blocks that can be equally processed. The preselection based division may be advantageous as it may provide a controlled optimized access to data blocks. The preselection criterion may comprise one of: the data blocks are equally sized; and the data blocks contain the same number of entries.

The term "data table" or dataset as used herein refers to a collection of data that may be presented in tabular form. Each column in the data table may represent a particular variable or attribute. Each row in the data table may represent a given member, record or entry of the data table.

The term "table part" as used herein refers to continuously stored subsets of the data table that have higher granularity than the data blocks of zone maps. This can be a fixed (but configurable) number of zone map blocks. However, in most database systems some concept exists that can be used as parts for partial reorganization. Some systems store the data pages in extents of a fixed size, some allow the data to be distributed over a number of table spaces. Also, some systems already have a partitioning concept that allows the data to be physically organized in certain ways, possibly supporting individual partitions of a table to be added, removed, or replaced in atomic fashion.

While FIG. 1 only shows a few attributes and data blocks, it will be appreciated that numerous attributes and/or data blocks may exist or may be used.

Figure 2:
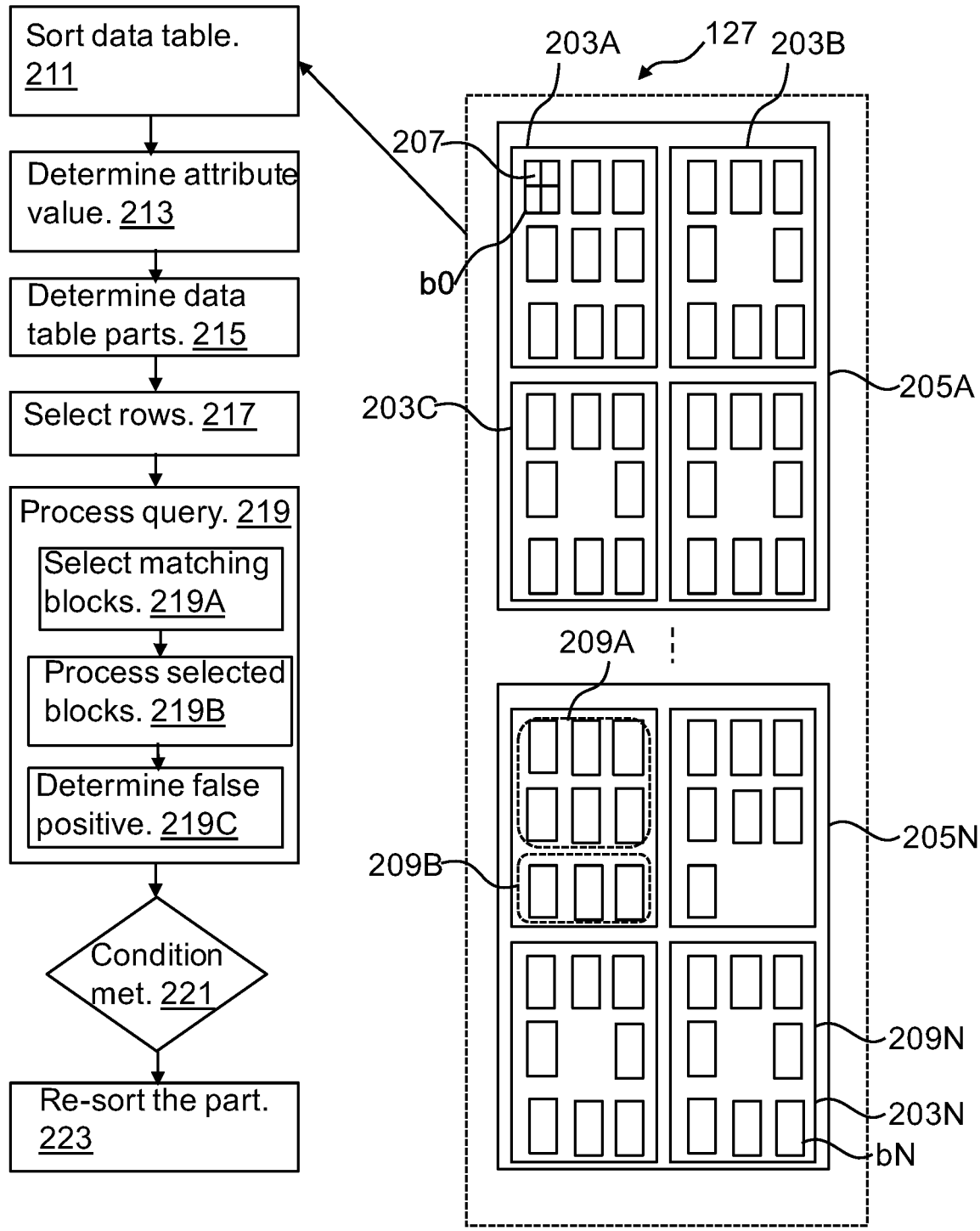
FIG. 2 is a flowchart of an exemplary method for processing a data table.

FIG. 2 is a flowchart of a method for processing a data table e.g. data table 127.

In step 211, the data table 127 may be sorted based by an attribute 131A-B (hereinafter referred to as organizing attribute or organizing column) of the data table 127. The organizing attribute 131A-B may for example be user defined. In another example, the organizing attribute 131A-B may randomly be selected out of the attributes 131A-B of the data table 127. The sorting may further comprise removing old versions of rows and/or reclaiming storage space of deleted rows. The sorting step 211 may be optional and the remaining steps may also be performed on an unsorted data table.

In step 213, attribute value information for data blocks b0-bN of the data table 127 may be determined. The attribute value information may for example indicate values of the attributes 131-A-B in the data blocks b0-bN.

For example, each data block of the data blocks b0-bN may be assigned an attribute value information indicative of a range of values of the organizing attribute 131B in the data block. The attribute value information may in addition or alternatively be indicative of a range of values of one or more other attributes 131A in the data block.

The assigning of the attribute value information to each of the data blocks b0-bN results in at least one extremum set of maximum and minimum values of the organizing attribute 131B. For example, data block b0 has a minimum value of the "Age" 131B of 35 and a maximum value of that attribute 131B of 56 and has a minimum value of the "ID" 131A of 35 and a maximum value of that attribute 131A of 56.

In another example, instead of having a single pair of [min/max] of minimum (min) and maximum (max) values per data block that describe an attribute of the data block, multiple pairs [min1/max1, min2/max2, . . . , minn/maxn] may be used so as to describe values of a given attribute of a data table 127 (e.g. an attribute describing spatial data). The single pair [min, max] may be used to describe one-dimensional spatial data e.g. "AGE" 131B, while the multiple pairs [min1/max1, min2/max2, . . . , minn/maxn] may be used to describe n-dimensional spatial data. The n pairs may define an n-dimensional minimum bounding rectangle (MBR) in the form of [min1/max1, min2/max2, . . . , minn/maxn] per data block. For example, an attribute of the data table 127 may comprise n sub-attributes each sub-attribute having a respective value. The respective value may have a min/max pair that defines the minimum and maximum values of the sub-attribute. The n pairs may be the values of a data element of a 2n dimensional data structure. The multidimensional MBR of a data block on an attribute may be defined as the smallest axis-parallel n-dimensional rectangle that contains all attribute values of the attribute that are stored in the data block. In the interest of a simpler presentation, assuming n=2 in this example, without loss of generality. For actual spatial data management, n=2 is typical. However, the present method may equally be applicable for higher numbers of dimensions.

For example, the determining of the attribute value information may comprise generating a multidimensional data structure (e.g. for each attribute of the data table 127) for representing the data blocks b0-bN. For each data block e.g. b1 of the data blocks b0-b9 a respective data element may be added into the multidimensional data structure, wherein the data element has values (e.g. the minimum and maximum values of the attribute in b1) of data block b1 indicative of the organizing attribute 131B.

The term multidimensional data structure refers to a data structure for indexing multidimensional information. The multidimensional data structure may for example represent a map that is viewed as a two dimensional image, whereby points on the map are stored as data elements on the multidimensional data structure. The multidimensional data structure supports various types of queries, e.g. a range query. For example, the multidimensional data structure comprises a spatial index. The spatial index may be used to divide the indexed space (space defined by the multiple values of the attribute and covering the data elements of the spatial index) into search rectangles (or index rectangles) each comprises a respective number of data elements. For example, a search rectangle may be defined by a lower left corner and an upper right corner. In case, the multiple attribute values assigned to a given data element comprise the minimum and maximum values of the first attribute in the respective data block, the lower left corner may be defined by the lowest minimum and maximum values of the requested range and the upper right corner may be defined by the highest minimum and maximum values of the requested range. Using this data structure only search rectangles that are covered by the query area may be searched. A search rectangle is either completely contained in, partially overlapping with, or disjoint with the query area. If a search rectangle is contained in the query area, then all its contained data elements are part of the query result. As no individual evaluation may be required, a big improvement over the conventional evaluation methods may be reached. Data elements in search rectangles that the query area partly covers may be evaluated individually. Search rectangles that are disjoint with the query area may be ignored. The query area is defined by two or more cuts on respective attribute values of the multiple attribute values.

As an example, FIG. 2 shows a storage structure or hierarchy of the data table 127. The data table 127 may be stored or split on multiple containers 205A-N. Each container 205A-N may comprise a number of extents 203A-N that fit in the container. Each extent may comprise a number of data pages 207. A data block b0-bN may cover a corresponding number of data pages 207. FIG. 2 illustrates that data block b0 has 4 corresponding data pages 207.

In step 215, parts 209A-N of the data table 127 may be defined or determined such that each part contains at least two of the data blocks b0-bN. The part may be defined using the number of data blocks or based on the storage size.

For example, the definition of the parts may randomly be performed e.g. a part may be defined to contain data blocks b0, b3, and b6 and another part may be defined to contain data blocks b1 and b10 etc. In another example, the parts 209A-N may be defined such that each part comprises the same number of data blocks b0-bN.

In another example, the parts may be defined such that each part has a predefined storage size. Each part may then comprise data blocks b0-bN that may fit in the respective storage size.

A part of the defined parts may or may not comprise contiguously stored data blocks.

In another example, the parts may be defined such that each part corresponds to an extent in the storage hierarchy provided by the computer system 100.

In step 217, one or more queries having respective query predicates involving the organizing attribute 131B may be received. For example, the queries may be received at once or over a span of time.

A query predicate may be an element of a search condition that expresses or implies a comparison operation. For example, each of the one or more queries may comprise a statement for selecting rows of the data table 127 that meet specified criteria. The criteria may be expressed in the form of predicates. Each of the one or more queries may have one or more query predicates on at least the organizing attribute 131B. For example, a query predicate may comprise a constant equality predicate (e. g. "AGE=17").

In step 219, a query of the received queries may be processed, wherein the processing of the received query comprises steps 219A-C.

In step 219A, each data block of the data blocks b0-bN whose attribute value information matches a query predicate of the query is selected. For example, the attribute value information of each of the data blocks b0-bN is read (e.g. using the multidimensional data structure) to determine whether a data block may contain rows that satisfy the query. Assuming, for exemplification purpose, the query searches for "AGE=17", since the attribute value information may comprise the minimum and the maximum value of the organizing attribute e.g. 131B, the data blocks whose range of values include the value 17 may be selected. Those selected data blocks may or may not contain the value 17. For example, data block b1 covers a range of values of the attribute 131B which is 10 to 35. This data block b1 may be selected as the range 10 to 35 includes searched value 17; however, no rows of b1 contain that searched value.

In step 219B, the selected data blocks may be processed for evaluating the query predicate.

In step 219C, a false positive rate may be determined for each part of a set of the parts. The set of parts may comprise all or a selected portion of the parts. The selected portion of the parts may randomly be determined or may be user defined. The false positive rate refers to the fraction of data blocks of the selected data blocks that each contains less than a determined maximum number of rows that satisfy the query predicate.

Step 219 may be repeated for each query of the received queries.

Part 209A is shown as containing 6 data blocks. Using the above example, out of the 6 data blocks only 4 data blocks may be selected as the 4 data blocks can satisfy the query condition "AGE=17". Thus, the selected data blocks comprise 4 data blocks. However, only a portion of the selected data blocks (e.g. 3 data blocks) comprise rows that have value of "AGE=17". For example, one data block of the selected data blocks comprises 1 row having value AGE=17, a second data block of the selected data blocks comprises 10 rows having value AGE=17, and a third data block of the selected data blocks has 5 rows having value AGE=17. The remaining data blocks (i.e. one data block) of the selected data blocks has no rows with value AGE=17. If the determined maximum number of rows is equal to 2, then the false positive rate would be for part 209A 33% (2/6) because only 2 data blocks out of the 6 data blocks satisfy the query and have a number of rows with value AGE=17 higher than 2.

After processing Step 219 for each of the received queries, each part of the set of parts may have false positive rates for respective received queries. For example, if 10 queries are received in step 217 and processed, each part of the set of parts may have 10 false positive rates.

For each part of the set of parts 209A-N, it is determined (inquiry 221) whether the determined false positive rates of the part meet a predefined condition, and if so the part is re-sorted by the organizing attribute in step 223. For example, if the average of the false positive rates of a part of the set of parts is higher than a predefined threshold e.g. 60%, then that part is re-sorted. This may result in a group of re-sorted parts that may comprise all or part of the set of parts. For example, after the re-sorting, step 213 may be repeated so as to determine or update the attribute value information for the data blocks b0-bN in particular for data blocks of the re-sorted parts.

Figure 3:
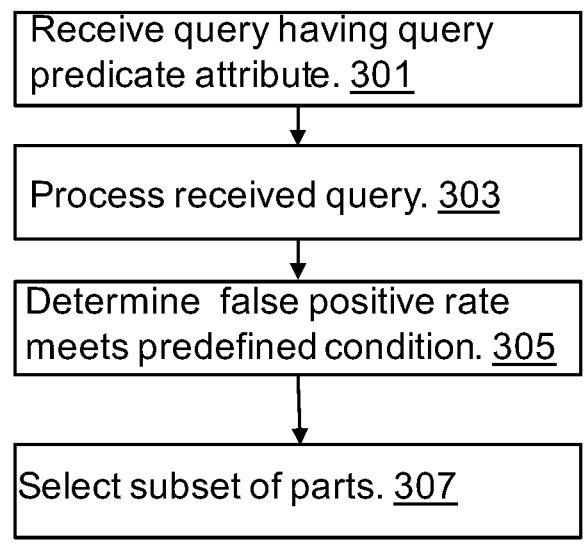
FIG. 3 is a flowchart of another exemplary method for processing the data table.

FIG. 3 is a flowchart of a method for processing the data table 127. The method of FIG. 3 may be executed after steps 211-223 of the FIG. 2 have been executed. In the example of FIG. 3, the parts of the data table 127 may be defined such that each part corresponds to an extent as described above i.e. all parts having the same extent level of granularity. As shown in FIG. 2 part 209D and 209N are defined as extents 203B and 203N respectively.

In step 301, a further query having a respective query predicate involving the organizing attribute 131B may be received. For simplicity of the description, only a single query is considered being received however more than one query can be used.

In step 303, step 219 is executed such that the received query is processed as described above with reference to steps 219A-C. This would result in each part of the set of parts having a false positive rate.

In step 305, it may be determined that the determined false positive rate of a given re-sorted part of the group of re-sorted parts meets the predefined condition e.g. the false positive rate is higher than the predefined threshold. For example, each part of the group of re-sorted parts the false positive rate is checked whether the predefined condition is meet and if so, step 307 may be performed.

In step 307, a subset of parts including the given re-sorted part may be selected from the set of parts. The subset of parts fit into a level of granularity higher than the extent and the subset of parts may be re-sorted. For example, if a re-sorted part 209D (e.g. that corresponds with extent 203B) has a false positive rate determined in step 303 that is higher than the predefined threshold, then the subset of parts would comprise the 4 parts 203A-D of the container 205A, because the container has a level of granularity (immediately) higher than the extent. These parts 203A-D would be re-sorted. These parts 203A-D may be sorted taking into consideration whether one of the parts 203A-D is sorted on not. For example, a merge-sort method may be used by merging the parts that are already in a sorted format. Other efficient sorting methods may be used.

For example, a part 209A of the data table may be sorted as follows. Each data block of the part 209A may either have up to a predefined maximum number of entries of the data table or may store entries of the data table requiring up to a predefined maximum amount of storage. The attribute value information of the attribute in each of the data blocks of the part 209A may contain a lower bound for a minimum attribute value of a data block, and an upper bound of the maximum attribute value of a data block. The part may be sorted or re-sorted or reorganized (e.g. by the organizing attribute 131B) by recursively using "divide and conquer sorting algorithms" (e.g. quicksort, radix sort, combinations thereof) to organize the part 209A to subsets fitting into the data blocks of the part. The "divide and conquer sorting algorithms" recursively partitions value range of the organizing attribute and assigns entries of the part 209A to resulting value range partitions. The "divide and conquer sorting algorithms" may be stopped for each value range partition when entries of the part assigned to the respective value range partition fit into a data block. The value range partitions generated by the "divide and conquer sorting algorithms" are stored in the data blocks.

In other words, the method of FIG. 3 provides a hierarchical partial reorganization. Some of the concepts of existing systems already have a hierarchical relation, for example an extent is inside a table space or partition. The present method can be applied at different levels at the same time. This way, reorganization of smaller parts can be performed as a less processing-intensive first step. If this does not achieve the desired effectiveness (e.g. the false positive rate is still high for re-sorted parts), reorganization at a higher level should be performed. As the last re-sort, the data table can still be fully reorganized. This way, the tradeoff between query performance and reorganization costs can be well balanced.

Each time reorganization takes place at a higher level (L+1), the table parts at level 1 do not have to be fully sorted. Instead, those parts at level L that are not organized at all are sorted into one sort run. Subsequently, this sort run is merged with the organized parts at level 1. This "merge-sort like" behavior is less processing-intensive than a full sort. Moreover, this procedure may be applied recursively. Also, if most parts at level L inside a single part at level (L+1) require reorganization, it should be considered to reorganize the entire part at (L+1). This may go up to a full table reorganization.

The present method may directly be applicable in a row-organized data management system or storage system, such as data warehouse appliance. In columns stores all columns of a table may be stored separately. As a consequence, the storage block boundaries (e. g. page boundaries) occur between values that belong to different rows for every column. The sequence of values in a column may, of course, always correspond to the respective row sequence. Thus, it may not be possible to reorganize only individual columns. Consequently, partial reorganization most likely affects fractions of storage blocks for most columns of a table. Depending on the granularity of the parts, this effect may be negligible though, as it only occurs at the boundaries of the part. After the partial reorganization, the new organized part can be written to new storage blocks, may offer better query performance as it facilitates skipping storage blocks in scans. It may, however, also be possible to use fractions of storage blocks also after the reorganization.

In another example, a method for processing a data table in a database management system, where data tables are stored on data blocks and attribute value information is provided for the data blocks. The method includes arranging sets of data block of the data table to a set of respective parts of the data table, each part containing at least two data blocks; organizing the data table based on an organizing column; processing queries having respective query predicates based on attribute value information, wherein a data block is accessed if the attribute value information of the data block matches a query predicate; monitoring table-part-specific false positive rates of the queries involving the organizing column [e.g. false positive: data block is accessed but contains no rows matching the query predicate]; in response to the table-part-specific false positive rate of a part of the data table meeting a predefined condition, reorganizing that part of the data table.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a non-transitory computer readable storage medium having program instructions embodied therewith, the program instructions executable by a processor, for performing a method comprising:
   determining attribute value information for data blocks of a data table;
   defining parts of the data table, each part containing at least two of the data blocks;
   receiving one or more queries having respective query predicates involving an attribute;
   processing each query of the one or more received queries, the processing comprising:
   selecting from the parts of the data table, each data block of data blocks whose attribute value information matches a query predicate of the query;
   processing the selected data blocks for evaluating the query predicate;
   for each part of a set of the parts: determining a false positive rate indicative of a fraction of data blocks of the selected data blocks of the part, that each contains less than a determined maximum number of rows that satisfy the query predicate;
   for each part of the set of parts: in response to determining that the determined false positive rates of the part meet a predefined condition;
   re-sorting the part based on the attribute;
   receiving a further query having a query predicate including an organizing attribute;
   determining that the false positive rate of a re-sorted part of a group of the re-sorted parts meets the predefined condition; and
   selecting from the set of parts a subset of parts, wherein the subset of parts includes the re-sorted parts, and wherein the subset of parts fit into a level of granularity higher than an extent, and wherein each of the parts corresponds to the extent.

2. The computer program product of claim 1, further comprising:
   determining a respective maximum number of rows based on the query predicate, wherein the program instructions to determine further comprises:
   providing patterns of query predicates, each pattern being associated with a respective category, wherein the category includes an equality, and an inequality alone or in any combination;
   parsing the query predicate into constituent parts;
   determining that a constituent part parsed from the query predicate corresponds to at least part of a pattern of the patterns;
   associating the category that is associated with the pattern with the query;
   determining the maximum number of rows based on the associated category; and
   determining the respective maximum number of rows based on the query predicate.

3. The computer program product of claim 2, further comprising:
   calculating an average of the determined false positive rates; the predefined condition comprising: the average being higher than a predetermined minimum threshold.

4. The computer program product of claim 1, wherein the maximum number of rows is jointly determined for the received queries.

5. The computer program product of claim 4, the maximum number of rows being one.

6. The computer program product of claim 4, the maximum number of rows being higher than one and smaller than a predefined maximum number.

7. A computer system for processing a data table, the computer system comprising:
   one or more processors, one or more computer-readable storage devices, and a plurality of program instructions stored on at least one of the one or more storage devices for execution by at least one of the one or more processors, and causing the at least one processor to execute the method comprising:

determining attribute value information for data blocks of a data table;

defining parts of the data table, each part containing at least two of the data blocks;

receiving one or more queries having respective query predicates involving an attribute;

processing each query of the one or more received queries, the processing comprising:

selecting from the parts of the data table, each data block of data blocks whose attribute value information matches a query predicate of the query;

processing the selected data blocks for evaluating the query predicate;

for each part of a set of the parts: determining a false positive rate indicative of a fraction of data blocks of the selected data blocks of the part, that each contains less than a determined maximum number of rows that satisfy the query predicate;

for each part of the set of parts: in response to determining that the determined false positive rates of the part meet a predefined condition;

re-sorting the part based on the attribute;

receiving a further query having a query predicate including an organizing attribute:

determining that the false positive rate of a re-sorted part of a group of the re-sorted parts meets the predefined condition; and selecting from the set of parts a subset of parts, wherein the subset of parts includes the re-sorted parts, and wherein the subset of parts fit into a level of granularity higher than an extent, and wherein each of the parts corresponds to the extent.

8. The computer system of claim 7, further comprising:

determining the respective maximum number of rows based on the query predicate, further comprising:

determining levels of storage granularity of the storage device;

determining the parts of the data table such that each part of the parts fits into a selected level of the levels of storage granularity;

providing patterns of query predicates, each pattern being associated with a respective category, wherein the category includes an equality, and an inequality alone or in any combination;

parsing the query predicate into constituent parts;

determining that a constituent part parsed from the query predicate corresponds to at least part of a pattern of the patterns;

associating the category that is associated with the pattern with the query;

determining the maximum number of rows based on the associated category; and determining the respective maximum number of rows based on the query predicate, wherein the maximum number of rows is one if the associated category is an equality predicate.

9. The computer system of claim 8, further comprising:

calculating an average of the determined false positive rates; the predefined condition comprising: the average being higher than a predetermined minimum threshold.

10. The computer system of claim 7, wherein the maximum number of rows is jointly determined for the received queries.

11. The computer system of claim 10, the maximum number of rows being one.

12. The computer system of claim 10, the maximum number of rows being higher than one and smaller than a predefined maximum number.

13. A computer implemented method, comprising:

determining attribute value information for data blocks of a data table;

defining parts of the data table, each part containing at least two of the data blocks;

receiving one or more queries having respective query predicates involving an attribute;

processing each query of the one or more received queries, the processing comprising:

selecting from the parts of the data table, each data block of data blocks whose attribute value information matches a query predicate of the query;

processing the selected data blocks for evaluating the query predicate;

for each part of a set of the parts: determining a false positive rate indicative of a fraction of data blocks of the selected data blocks of the part, that each contains less than a determined maximum number of rows that satisfy the query predicate;

for each part of the set of parts: in response to determining that the determined false positive rates of the part meet a predefined condition;

re-sorting the part based on the attribute;

receiving a further query having a query predicate including an organizing attribute;

determining that the false positive rate of a re-sorted part of a group of the re-sorted parts meets the predefined condition; and selecting from the set of parts a subset of parts, wherein the subset of parts includes the re-sorted parts, and wherein the subset of parts fit into a level of granularity higher than an extent, and wherein each of the parts corresponds to the extent.

14. The method of claim 13, the processing of the query comprising determining the respective maximum number of rows based on the query predicate.

15. The method of claim 13, further comprising:

providing patterns of query predicates, each pattern being associated with a respective category;

parsing the query predicate into constituent parts;

determining that a constituent part parsed from the query predicate corresponds to at least part of a pattern of the patterns;

associating the category that is associated with the pattern with the query; and determining the maximum number of rows based on the associated category.

16. The method of claim 13, further comprising: calculating an average of the determined false positive rates; the predefined condition comprising: the average being higher than a predetermined minimum threshold.

* * * * *